United States Patent [19]

Bartolanzo, Jr. et al.

[11] Patent Number: 5,321,815
[45] Date of Patent: Jun. 14, 1994

[54] ROUTE SELECTION USING CACHED PARTIAL TREES IN A DATA COMMUNICATIONS NETWORK

[75] Inventors: Leo J. Bartolanzo, Jr., Durham; Robert D. Clouston, Cary, both of N.C.; John E. McGinn, Rochester, Minn.; William E. Siddall, Chapel Hill, N.C.

[73] Assignee: International Business Machines Corp., Armonk, N.Y.

[21] Appl. No.: 962,626

[22] Filed: Oct. 16, 1992

Related U.S. Application Data

[63] Continuation of Ser. No. 421,423, Oct. 13, 1989, abandoned.

[51] Int. Cl.⁵ .............................................. G06F 13/14
[52] U.S. Cl. ................................... 395/200; 340/827; 364/DIG. 2; 364/940.92
[58] Field of Search ........................................ 395/200

[56] References Cited

U.S. PATENT DOCUMENTS

| | | | |
|---|---|---|---|
| 3,703,006 | 11/1972 | Sharma | 364/200 |
| 4,466,060 | 8/1984 | Riddle | 364/200 |
| 4,825,206 | 4/1989 | Brice, Jr. et al. | 340/825.02 |
| 4,873,517 | 10/1989 | Baratz et al. | 340/825.03 |
| 4,914,571 | 4/1990 | Baratz et al. | 364/200 |
| 4,987,536 | 1/1991 | Humblet | 364/200 |

Primary Examiner—Gareth D. Shaw
Assistant Examiner—Kakali Chaki
Attorney, Agent, or Firm—Gerald R. Woods

[57] ABSTRACT

A process for selecting a least weight path between two nodes in a data communication network uses partial trees created and cached in prior route selection operations. All root nodes on possible paths between the two nodes are identified. Any cached tree having a root matching one of the identified root nodes is retrieved from storage. If necessary, each retrieved tree is extended until it includes all possible destination nodes. The extended and/or retrieved trees are used to select the least weight path between the two nodes. The extended tree is then cached for possible use in future route selection operations.

2 Claims, 6 Drawing Sheets

FIG. 1

EN-END NODE
NN-NETWORK NODE

ROUTE SELECTION USING CACHED PARTIAL TREES IN A DATA COMMUNICATIONS NETWORK

This is a continuation of Ser. No. 07/421,423 filed Oct. 13, 1989, now abandoned.

FIELD OF THE INVENTION

The present invention relates to data communications networks and more particularly to a technique for selecting a preferred route between two nodes using partial trees cached in the course of prior route selection operations.

For purposes of the following descriptions, a data communications network can be generally defined as a collection of network nodes and end nodes interconnected through communications links. A network node can be characterized as a data processing system that provides certain functions within the network, such as routing of messages between itself and its adjacent or neighboring nodes, selection of routes for messages to be transmitted between two nodes and the furnishing of directory services to connected end nodes. The link between nodes may be permanent communications links such as conventional cable connections or links that are enabled only when needed, such as dial-up telephone connections. End nodes are exemplified by devices such as display terminals, intelligent workstations, printers and the like which do not provide routing or route selection or directory services to other nodes in the network. Collectively, the network nodes, the end nodes and the links between the nodes are referred to as network resources. The physical configuration and characteristics of the various nodes and links in a network are said to be the topology of the network.

For a user at one end node to exchange data with another user at another end node, a path or route must be set up through the network. The route will include the end node at which the first user is located (origin end node), the end node at which the second user is located (the destination end node), possibly one or more network nodes and the links or transmission groups which connect the nodes on the route. A transmission group is normally defined as a set of parallel links with similar characteristics that form a single logical link that has a higher capacity than each of the individual links in the group. For purposes of the following discussion, it should be assumed that the term transmission group can also contemplate a single physical link. The terms are used interchangeably in the following description.

In an ideal network, data provided by a first user is transmitted to a second user at no cost, with zero delays, with perfect reliability and with complete security regardless of how many nodes and transmission groups might be included in the route between the two users. Unfortunately, real data communications networks lack these ideal characteristics. Varying amounts of delays may be introduced over different routes. Some types of transmission groups may cost more to use or introduce more delay than others. The integrity of transmitted data may be protected better on some transmission groups than others. Other "imperfections" not even discussed above exist in a real network.

Because nodes and transmission groups in a real network possess different characteristics, it is a common practice to assign weights to both nodes and transmission groups and to use the assigned weights in computing an optimal or least weight route through the network from one user to another. The weight generally reflects how closely a given node or transmission group meets a predetermined standard of performance. For example, if weights were to be assigned on the basis of delay characteristics alone, a high-delay transmission group would have a greater assigned weight than a low-delay transmission group.

In determining a "best" route through a network from a first user at one end node to a second user at another end node, a network node (usually the one serving the originating end user) sums the weights of nodes and transmission groups in various potential routes. The route having the lowest total weight, which is understandably referred to as the least-weight route, is considered to be the "best" route between the users.

The network node performing a route selection function must have access to the characteristics or weights of the various nodes and transmission groups in the network. This information takes the form of a topology database stored at the node.

A least weight path extending from an originating node to other nodes in a network is represented by a tree, which is simply a map showing the nodes which are on the path and the transmission groups which are used to connect each of these nodes to the next node on the path. There are two known techniques for creating trees during route computation or selection. According to one technique, a tree is created one node at a time only until the desired destination is reached. The tree is discarded after being used to set up a session between two users. According to the second technique, a tree is created for the entire network and is then cached or stored for use in future route selection operations.

The advantage of the first technique is that a minimum number of computations is needed to create any particular tree since the computations are terminated once the desired destination is reached. The disadvantage of the first technique is that a tree must be created every time a route is selected, no matter how many times the same route between the same two nodes may need to be established.

In an extremely stable network, that is, one in which the status of network resources rarely changes, it can be advantageous to employ the second technique; that is, the building and caching of a complete network tree. Since the tree is cached, it can be used in subsequent route selection operations. However, even in an extremely stable network, the second approach is not without disadvantages. If the network is a relatively complex one, it may require a considerable amount of time to create the tree initially. The establishment of a session between two nearby nodes will be delayed as a complete network tree is being created. A more significant problem is that few communications networks can be characterized as extremely stable. Resources are frequently added to or removed from the network. The status of other resources may change even though the resources remain in the network. Some of these changes will alter preferred or least weight paths within the network, thereby invalidating a tree covering the entire network. Thus, complete network trees for a "real" network will frequently become obsolete and have to be rebuilt from the root up. As noted earlier, it takes time and network resources to build a complete tree.

DISCLOSURE OF THE INVENTION

The invention reduces the number of computations required to build a tree connecting any two nodes in the network. The invention also reduces the number of trees which must be created during normal network operations.

The invention is to be used in a data communications network including nodes and interconnecting links. At least one of the nodes in the network includes means for computing preferred paths between nodes and for storing the results of each path computation in the form of a tree. The invention is a method of using a stored tree to help compute a preferred path from a first node to a second node regardless of whether the second node is included in the stored tree. The method includes the steps of retrieving a tree having the first node as the originating or root node. If the retrieved tree includes the second node, it is used in its stored form to determine the preferred path to the second node. If the retrieved tree does not include the second node, the tree is extended to the second node. The extended tree is then used to determine the Preferred Path from the first node to the second node.

BRIEF DESCRIPTION OF THE DRAWINGS

While the technical description concludes with claims particularly pointing out and distinctly claiming that which is regarded as the present invention, details of a preferred embodiment of the invention may be more readily ascertained from the following technical description when read in conjunction with the accompanying drawings wherein:

TECHNICAL DESCRIPTION

Figure 1:
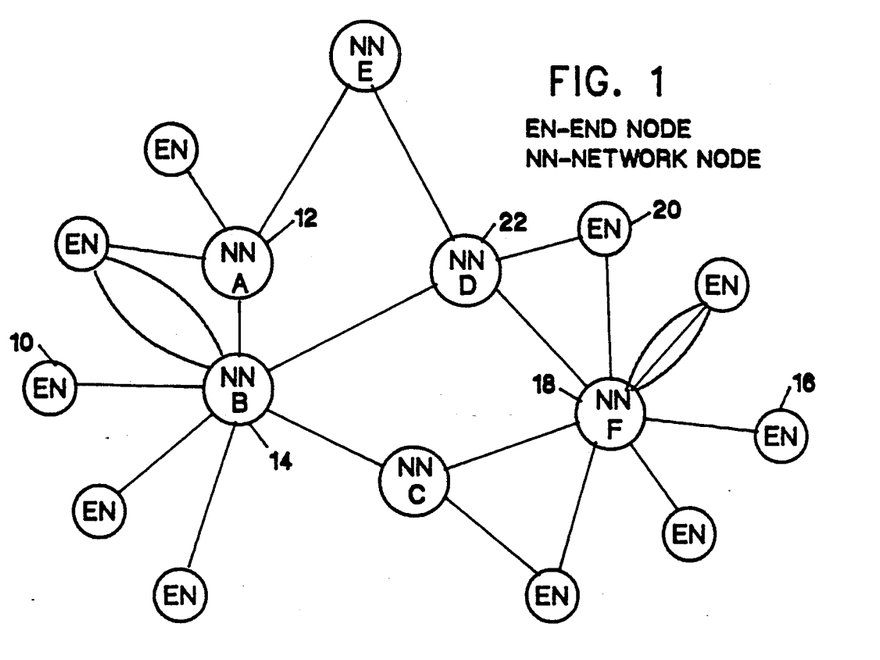
FIG. 1 is a schematic representation of a data communications network of a type in which the present invention may be practiced.

FIG. 1 is a schematic representation of a type of data communications network in which a distinction is made between different nodes on the basis of the functions performed by those nodes. The network includes both end nodes (EN) and network nodes (NN). As noted earlier, a network node can be characterized as a data processing system that performs certain functions such as route selection and the furnishing of directory services to connected end nodes. End nodes may also include data processing systems but do not perform routing or directory services to other nodes. Nodes can be connected by temporary or permanent links or transmission groups, which are the physical and logical mediums over which data is transmitted between adjacent nodes. As can be seen in FIG. 1, every end node is connected to at least one network node. End nodes may be connected to more than one network node and may have parallel connections to the same network node. For example, end node 10 has a single link to network node 12 as well as parallel links to network node 14. A network node performing directory or routing services for an end node may be referred to as a network node server (NNS) for that end node.

In discussing the route selection process, nodes may be referred to by names which define the role they play in the process. An originating node is usually an end node that initiates a request that a route be established between itself and a second node. The target of the request, usually another end node, is referred to as the destination node or simply destination. While the originating node and the destination node are usually end as well. For example, if data entered at end node 10 indicated that a session was to be established with end node 16, end node 10 would be characterized as the originating node while end node 16 would be characterized as the destination node. Alternatively, a program executing at network node 12 may call for establishment of a path to network node 18. In that situation, network node 12 would be the originating node, while network node 18 would be the destination node. A network node directly connected to an originating end node originating a route selection request may be referred to as an originating network node or ONN. Similarly, a network node connected to an end node that is the destination of a route selection request may be referred to as a destination network node or DNN.

In creating network trees, other terms are encountered. The root node of a tree is the node at which the tree begins. The target node is the last node to be reached by the tree. A root node and a target node in a tree are each connected to one other node in the tree except for the trivial case where the root node and target node are the same node. Other nodes in a non-trivial tree are intermediate nodes which are connected to two nodes. No node in a tree is connected to more than two other nodes.

In the type of network illustrated in FIG. 1, there may be multiple trees which can be used in establishing paths between an originating end node and a destination end node. For example, in establishing a route between end node 10 and end node 20, there will be at least two trees. The root for one tree would be network node 12. The root for a second tree would be network node 14. Both of network nodes 18 and 22 represent possible target nodes for a tree consisting only of network nodes.

Figure 2:
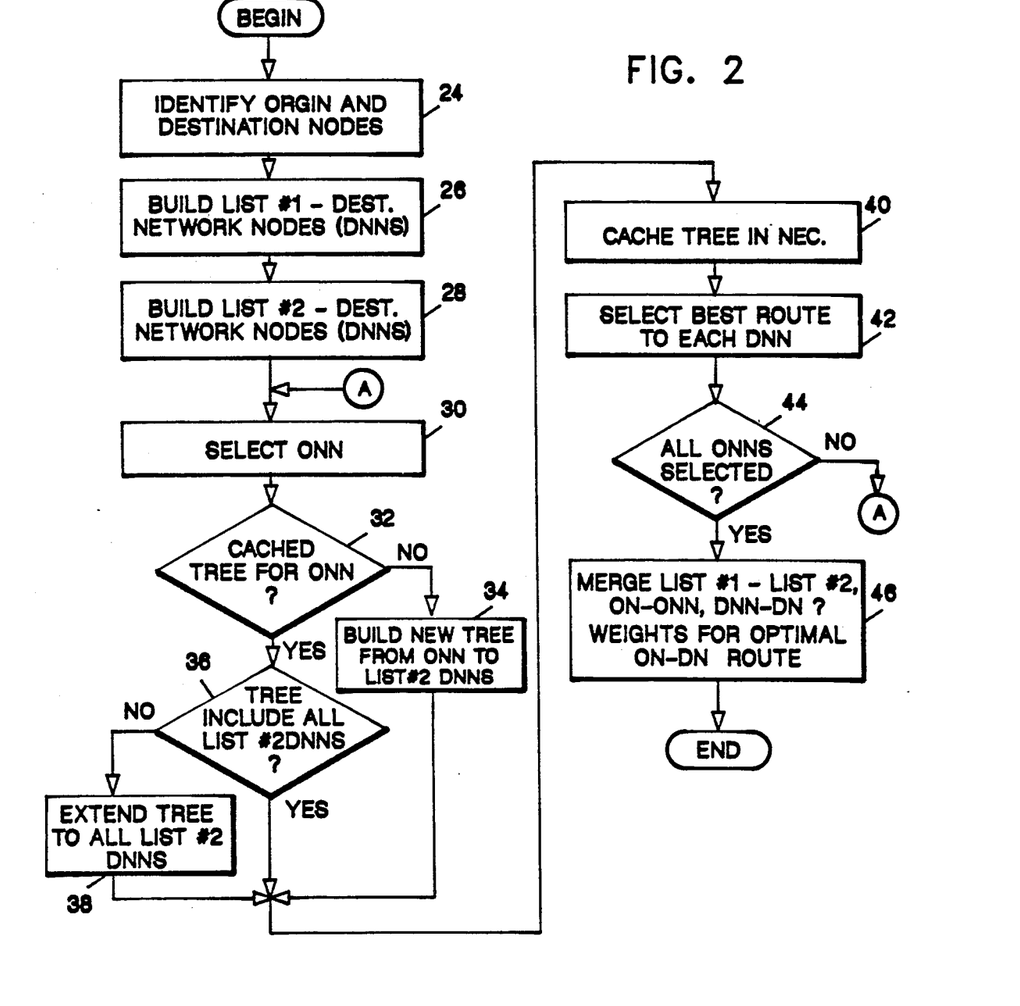
FIG. 2 is a flow chart of the overall process of route selection using cached trees, which may be complete or partial as cached.

FIG. 2 illustrates a route selection process performed in the type of network in which network nodes compute routes in a staged or concatenated process. If an originating end node is connected to a plurality of network nodes or a destination end node is connected to a plurality of network nodes, the network nodes serving the originating end node will build trees or paths connecting every network node connected to the originating end node to every network node connected to the destination end node. The network node server then concatenates the weights of the various trees with the weights of links connecting the originating end nodes to its network nodes and the destination end node to its network nodes. The concatenation yields the least weight path between the two end nodes.

FIG. 2 is a flow chart of the overall process performed in selecting a route between two end nodes in a network of the type shown in FIG. 1. As noted earlier, only network nodes are initially included in the tree and there will be as many trees as the number of network nodes connected directly to the originating end node. The initial step 24 in any route selection operation is to identify the origin and destination nodes. This information is provided either by a user who wishes to establish a session between the two nodes or by an application program which generates a call for such a session. A first list is built (step 26) of network nodes connected directly to the origin node. Such nodes may be referred to in this description or in the drawings as ONNs. A second list must also be built in a step 28 of network nodes (DNNs) connected directly to the destination node.

Once the two lists have been built, one of the origin network nodes is selected (step 30) and a check (step 32) is made to determine whether the network node server contains a cached or stored tree in which the selected ONN is the root node. If no tree is found, a new tree must be built (step 34) leading from the selected ONN to each of the DNNs on the second list. If a cached tree is found in step 32, a further check (step 36) is made to determine whether the tree includes all of the DNNs on the list built in step 28. Assuming the tree is an incomplete or partial tree that does not include the identified DNNs, the tree must then be extended (step 38) to include all identified DNNs. The steps which must be taken to extend a tree are described later.

When the operations indicated by blocks 32, 34, 36 and 38 have been completed, a tree will exist that extends from the selected ONN to each of the identified DNNs. If the tree is newly built or has been extended from its original cached form, the new tree is cached (step 40) and is used (step 42) to select the best or least weight route from the selected ONN to each of the DNNs. A check 44 is made to see if the process has been performed for all of the ONNs on the list generated in step 26. If not, the sequence of operations is repeated beginning at step 30, where another ONN is selected.

The tree or trees built in the preceding operations contain a numeric value for each path from an ONN to each DNN. To select the optimum or least weight path from the originating node to the destination node, these values or weights must be combined with known weights for the links between the originating nodes and the ONNs and between the destination node and the DNNs. This merge or concatenation operation is identified by block 46.

FIG. 2 assumes a network in which an end node cannot perform route selection operations. If the network is one in which every node is capable of performing route selection operations, the same basic steps would be performed by the originating node. List 1 would have a single entry. Similarly, list 2 would have a single entry. In such a network, the program described with reference to FIG. 2 would compute the least weight path in a single pass. No loops or reiterations would be required.

Figure 3:
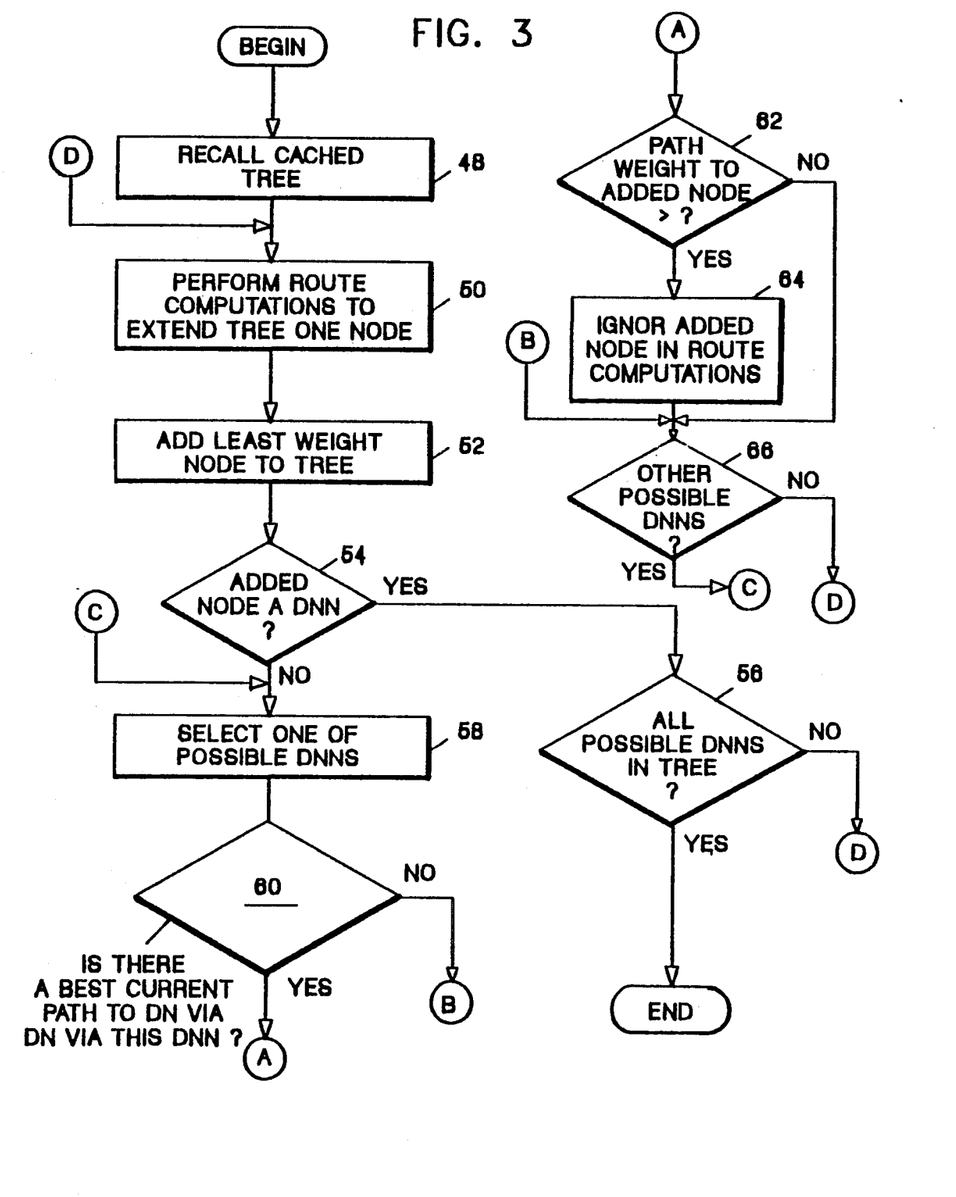
FIG. 3 is a flow chart of specific steps performed to extend a partial cached tree.

As noted earlier, an existing tree found in cache storage may be used as a base for a new, extended tree including all possible DNNs. FIG. 3 is a flow chart of the steps which are performed to extend an existing, partial tree. The process begins by recalling the cached tree in step 48. When the cached tree has been recalled, a sequence of steps (represented by block 50) is performed to determine the next node to be added to the tree. The operations represented by block 50 will be described in more detail with reference to FIG. 4.

These operations are, by themselves, conventional ones. Once the tree has been extended by adding a least weight node (step 52), a check 54 is made to see if the added node is one of the identified destination network nodes. If the added node is a destination network node, a further check 56 is made to determine whether all possible destination network nodes have been incorporated into the tree. If they have, the process is terminated. If they haven't, the process resumes with operation 50.

Assuming the added node was not a destination network node, a series of operations is performed to determine whether it would be profitable to continue building the tree from the added node. These operations compare any known paths to the destination node through its network nodes with any paths that might be established through the added node. If the paths through the added node already have a greater weight than a known path to the destination node, there is no point in extending the tree from the added node since the path weight through the added node would always exceed the known path to the destination node. This sequence of steps begins with operation 58 in which one of the possible destination network nodes is selected. A check 60 is made to see whether there is a best current path to the selected destination network node. If operation 60 reveals that a possible path already exists to the destination node through the selected destination network node, the weight of the path through the added node is compared to the weight of the current path in an operation 62. If the path weight through the added node is greater than the known current path, the added node is ignored (block 64) in subsequent route computations relating to this tree.

If, however, there is no current path to the destination node through the selected destination network node or the weight assigned to the path through the added node is less than the weight of any current path, a check 66 is made to see whether there are additional destination network nodes against which the same type of comparison should be made. If there are additional destination network nodes, the sequence of steps beginning with step 58 is repeated. If all possible destination network nodes have been considered, the tree is again extended by a single node by the sequence of steps beginning at block 50. When the operations 54 and 56 indicate that all possible destination network nodes have already been added to the tree, the subprocess defined by FIG. 3 is terminated and the program control returned to the point at the output of block 38 in FIG. 2.

Figure 4:
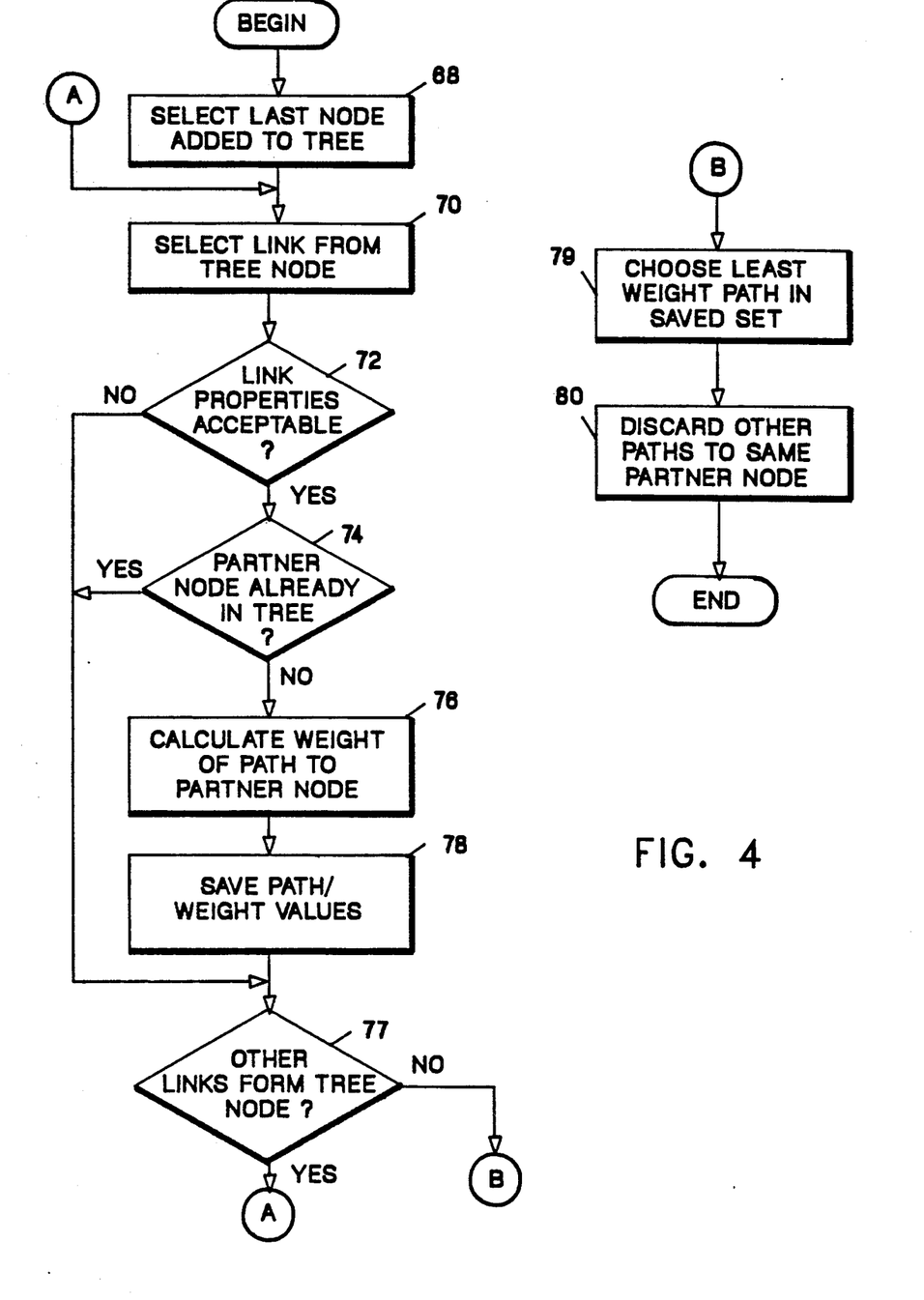
FIG. 4 is a flow chart of steps required to add another node to any tree as that tree is being created.

As noted above, known operations are performed in operation 50 to extend a tree by a single node. These operations are the same whether a cached, partial tree is being extended or a new tree is being built from its route. FIG. 4 is a flow chart of the steps represented within the single block 50. The operations defined by FIG. 4 use two sets of nodes. A set T of nodes consists of nodes already in the tree. A set S of nodes includes other nodes connected directly to nodes already in the tree. The first step in the route computation process (block 68) is to identify the last node added to a tree. If there is no tree, this node is represented by the root or originating network node. One of the links from the last (or root) node is selected in a step 70 and the characteristics of the link are checked (step 72) to determine whether the link would be suitable for the type of session to be established over the route. A link with the proper characteristics is usually referred to as having the right class of service. Assuming the link properties are acceptable, a check 74 must be made to determine whether the node at the opposite end of the link is already in the tree. Assuming the partner node is not already in the tree, the weight of the path from the selected node through the selected link to the partner node is calculated (step 76) and the path information and weight values or vectors are stored in set S. A further check is made (step 77) to see whether there are additional links from the selected node in the tree. If there are additional links, one of those links is selected and the process beginning with step 70 is repeated.

If it had been initially found in step 72 that the properties of the selected link were not acceptable or if it were found in step 74 that the Partner for the selected link was already in the tree, no attempt would be made to calculate the weight of the path through that link. Instead, the program would branch directly to the input of step 77 to see if additional links existed.

Once the weight of all acceptable paths from the tree node have been calculated and added to set S, the weight of those paths are compared. Set S may include paths established in the immediately preceding series of operations and paths which were established and saved when the process was performed with respect to other nodes added to the tree earlier. The least weight path in the saved set is chosen (step 79) and all other saved paths to the node in the chosen path are discarded before the operations defined by FIG. 4 are terminated.

Figure 5:
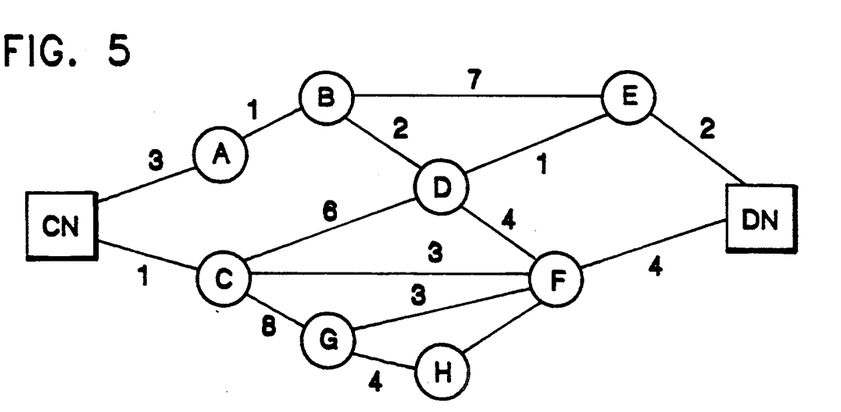
FIG. 5 is a schematic representation of a network showing differently-weighted links.

The processes described above are illustrated with reference to FIGS. 5 and 6. FIG. 5 is a schematic representation of a communication network including an originating node ON and a destination node DN with intermediate nodes A-H. It is assumed that two partial trees had previously been generated for this network. The first partial tree includes nodes A, B and D. The second partial tree consists of nodes C and G. It is further assumed that a user at node ON wishes to establish a session with a user at node DN.

In FIG. 5, numeric weights are assigned only to the links so as to simplify the example to be discussed. Normally, a numeric weight would also be assigned to each node; the node weight would be added to the weight of any path going through the node to determine a total path weight.

In selecting a least weight path between nodes ON and DN, the nodes connected directly to node ON (node A and node C) are identified and included in a first list. Similarly, nodes connected directly to node DN (node E and node F) are identified and included in a second list. Any partial tree having a node A or node C is identified and retrieved from cache storage. Partial trees ABD and CG are retrieved from storage in this example. This is illustrated at 82 and 84, respectively, in FIG. 6. In the following discussion, the operations required to fully extend partial tree ABD to nodes E and F will be discussed as if those operations were completed before any similar operations were performed with respect to tree CG. It should be recognized that, in reality, the computations required to extend the two trees may be performed by a processor in an interleaved mode.

In accordance with one embodiment of the invention, a set of nodes (set S) directly connected to the nodes already in the tree may be stored with the tree. In another embodiment of the invention, the set S is recreated once the partial tree is retrieved from the cache.

Figure 6:
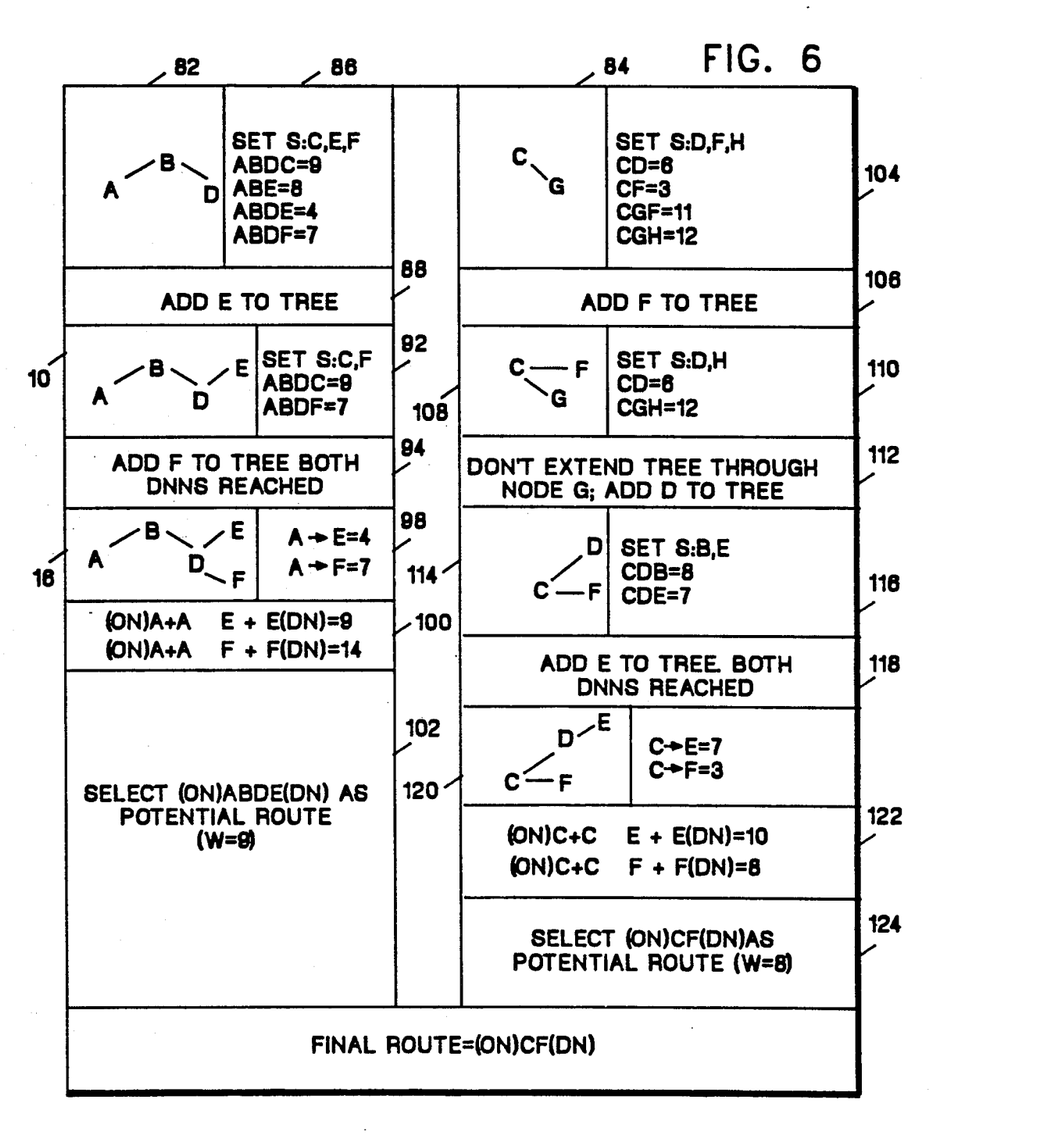
FIG. 6 is a state diagram illustrating the process of route selection in the FIG. 5 network where partial trees had previously been cached.

The initial set S for cached tree ABD consists of nodes C, E and F. The weight of the paths from nodes already in the tree to the nodes in set S are calculated and temporarily saved. This is shown at 86. Since the path ABDE to node E has the lowest weight in the saved set, the tree is extended (block 88) to node E via node D. The alternate path ABE to node E is discarded. The extended tree is shown at 90. In this example, no new nodes are then added to set S since all of the network nodes connected directly to nodes in the tree are already in set S or are themselves in the tree. The weights of the temporary paths ABDC and ABDF are compared (block 92). Since the latter path has the lower weight, the node F on that path is added to the tree (block 94). With the addition of node F to the tree, the tree extends to both destination network nodes as shown in 96 with the path weights indicated in 98. To establish the total path weights from the originating node ON to the destination node DN, these tree path weights must be combined with the path weight from ON to A and from each of nodes E and F to DN. The concatenation yields the path weight shown at 100 and results in selection of path ABDE as the best potential route from node ON to node DN via node A. This is shown at 102.

Similar computations must be performed with respect to the partial tree CG. The set S of nodes connected directly to nodes in this tree consists of nodes D, F and H. As shown at 104, there are several links between nodes already in the tree and the nodes in set S. Path CF has the least weight. The tree is extended from node C directly to node F (block 106) and path CGF is discarded. The extended tree is shown at 108. No new nodes are added to set S.

It will be noted that node F is one of the nodes on list 2. As a result of the process described with reference to FIG. 3, it will be seen that any path ultimately leading to the destination node via node F and node G will necessarily have a greater weight than the weight of the path CF. For that reason, nodes directly connected to node G could not possibly be part of a least weight path to node F and will be ignored in future computations.

Since the path CD is the least weight path in the set, node D is added to the tree (block 112) to yield the partial tree shown at 114. The addition of node D yields a new set S of nodes consisting of nodes B and E. The path weights to those nodes via node D are shown at 116. Since the path to node E has the lesser weight, node E is added to the tree (block 118) to yield the tree shown at block 120. With the addition of node E to the tree, both of the nodes (E and F) on the second list are included in the tree having node C as a root.

To establish the overall weight of the paths from the origin node ON to the destination node DN via the root node C, the path weights are concatenated as shown at 122 and path CF is selected (block 124) as the least weight path between the origin and destination nodes via root node C.

Since the path through the network via root node C has a lower weight than the path through the network via the root node A, the path via route C is finally selected as the least weight path between the origin and destination nodes.

Because the computations described above begin with partial cached trees, the trees do not have to be completely rebuilt as part of the root selection process. Because the cached trees extend only from the root to the desired destination and do not encompass the entire network, there is less chance that the trees will be invalidated by a change in status of a network resource.

Figure 7:
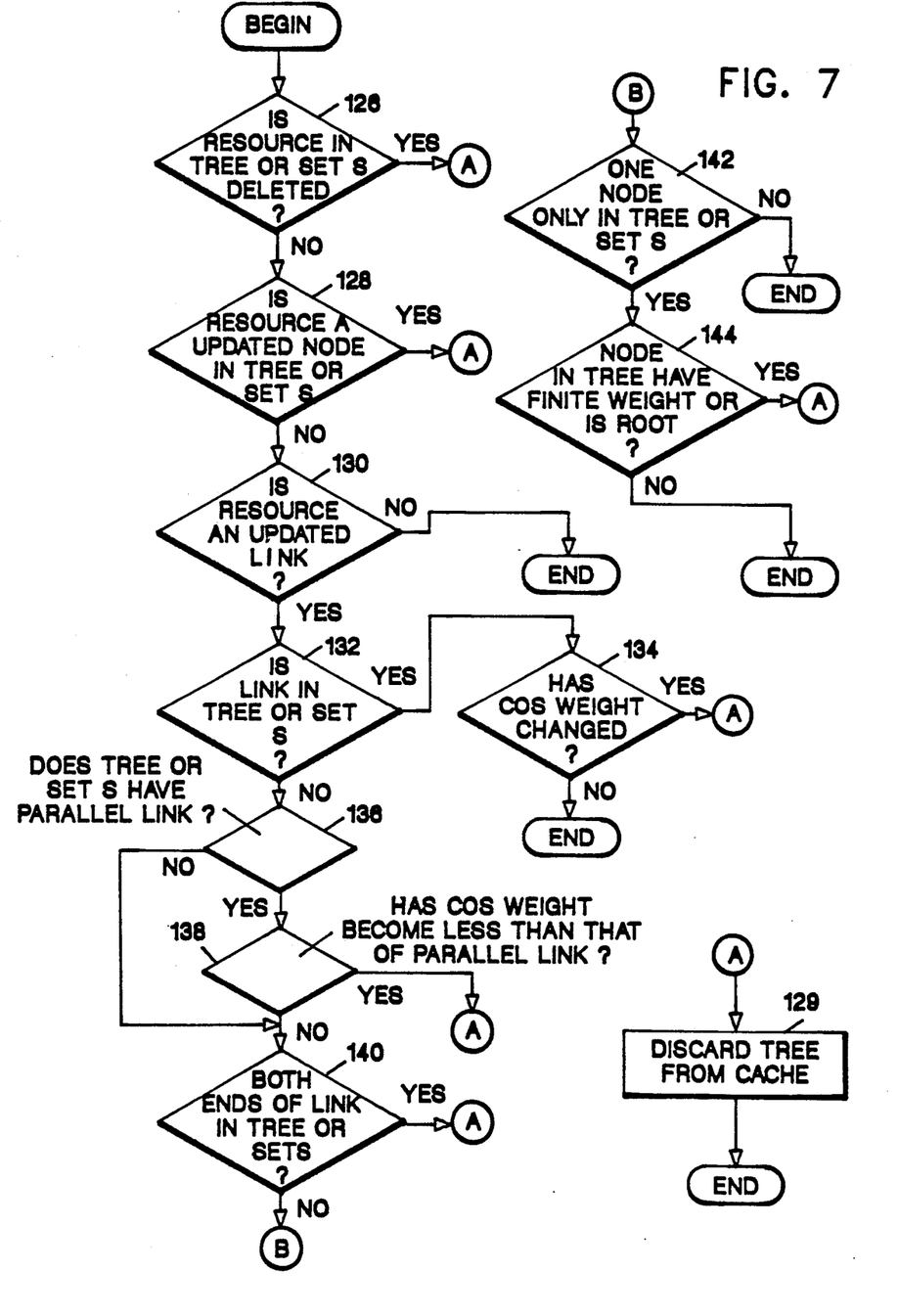
FIG. 7 is a flow chart of method steps which are performed in deciding whether to retain a previously-cached tree upon a change in network resources.

FIG. 7 depicts the steps which are followed in deciding to keep or discard a cached tree when the status of a network resource changes. If a check 126 indicates the network resource is one that has been deleted and that resource is included either in the tree or in set S, the tree is discarded from the cache in an operation 129. Otherwise, a check 128 is made as to whether the weight of any node included in the tree has been changed due to a change in class of service definition or changes in properties of the resource. If there has been a change in class of service, the tree is discarded. If not, a further check 130 is made as to whether a link property has been changed. If there has been no change in a link property, the maintenance process is terminated. If, however, a link property is changed somewhere in the network, a check 132 is made to see whether that link is either in the tree or connects a node in the tree to one of the nodes in set S. A positive result at operation 132 leads to a subsequent check at 134 as to whether the class of service weight of that link has changed. If it has, the cached tree is discarded. If it hasn't, the maintenance sequence is terminated. If the updated link is not found to be either in the tree or to connect a tree node to a set S node, a further check 136 must be made to see whether a parallel link meets those requirements. If there is a parallel link, a check 138 must be made as to whether the class of service of the parallel link has been reduced. If the class of service of the parallel link has been changed, the tree is discarded. If, however, there is no parallel link or if the class of service of a parallel link has not been reduced, an additional check 140 is made to see if both ends of the link are either in the tree or in set S. If both ends are in the tree or set S, the tree is discarded. If both ends are not, a check 142 is made as to whether only one of the two nodes is in either the tree or set S. A negative response to check 142 means that neither of the nodes is in the tree or in set S and the maintenance process is terminated. A positive response to check 142 means that only one of the two nodes is in the tree or set S. A check 144 is made to see whether the node that is in the tree either as a finite weight or is a root node. If neither of these conditions exists, the maintenance operation is terminated. If either exists, the tree is discarded.

While there have been described preferred embodiments of the invention, variations and modifications in those embodiments will occur to those skilled in the art once they become aware of the basic concepts of the invention. Therefore, it is intended that the appended claims shall be construed to include not only the preferred embodiments, but also such variations and modifications as fall within the true spirit and scope of the invention.

Having thus described our invention, what we claim and desire to secure by Letters Patent is as follows:

1. For use in a data communications network having end nodes and network nodes, said network nodes being capable of storing network topology information including routing trees defining least weight paths between different network nodes and of providing route selection services for at least one end node, an improved method of establishing a least weight path between a first end node and a second end node, said method comprising the steps of:
   a) examining the stored network topology information to build a first list of network nodes connected to the first end node and a second list of network nodes connected to the second end node;
   b) examining the stored network topology information to determine the weight for each path between the first end node and each of the network nodes on the first list and the weight for each path between the second end node and each of the network nodes on the second list;
   c) selecting a network node from the first list;
   d) determining whether there is a stored routing tree for which the selected network node is the root node;
   e) if no such routing tree is determined to exist, constructing a routing tree beginning with the selected network node as the root node and extending to all network nodes on the second list;
   f) if such a routing tree is determined to exist, extending the tree as necessary until it includes all network nodes on the second list;
   g) repeating the steps b, c, d and e until all network nodes on the first list have been selected; and
   h) combining the weight of the least weight path from each network node on the first list to each network node on the second list with the weights of the paths from the first end node to the network nodes on the first list and the weights of the paths to the second end node from the network nodes on the second list to determine the least weight path from the first node to the second node.

2. In a data communications network having end nodes and network nodes, said network nodes being capable of providing route selection services for end nodes, an improved network node including:
   a) means for storing network topology information including the weights of paths between the network node and the end nodes which it serves and routing trees defining least weight paths between pairs of network nodes;
   b) means responsive to a request to select a route from a served first end node to a remote second end node to generate a first list consisting of network nodes connected to the first end node and a second list consisting of network nodes connected to the second end node;
   c) means for crating for storing a set of routing trees defining least weight paths from each of the network nodes on the first list to all the network nodes on the second list, said means for creating extending previously stored routing trees where possible to create the set;
   d) means for combining the weight for each routing tree in the set with the weights of the paths from first and second end nodes to the network nodes in the tree to determine the weights of the possible paths from the first end node to the second end node; and
   e) means for selecting the path having the least weight as the route from the first end node to the second end node.

* * * * *

UNITED STATES PATENT AND TRADEMARK OFFICE
CERTIFICATE OF CORRECTION

PATENT NO. : 5,321,815
DATED : June 14, 1994
INVENTOR(S) : Bartolanzo, Jr. et al It is certified that error appears in the above-indentified patent and that said Letters Patent is hereby corrected as shown below:

Column 10, line 49, change "crating" to --creating--.

Signed and Sealed this

Sixth Day of September, 1994

Attest:

BRUCE LEHMAN

Attesting Officer     Commissioner of Patents and Trademarks